United States Patent
Diab et al.

(10) Patent No.: US 8,705,596 B2
(45) Date of Patent: Apr. 22, 2014

(54) SYSTEM AND METHOD FOR PHYSICAL LAYER DEVICE ENABLED CLOCK DIAGNOSTICS

(75) Inventors: Wael William Diab, San Francisco, CA (US); Scott Powell, Alisa Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1010 days.

(21) Appl. No.: 12/762,422

(22) Filed: Apr. 19, 2010

(65) Prior Publication Data

US 2011/0255427 A1    Oct. 20, 2011

(51) Int. Cl.
*H04B 3/36*    (2006.01)

(52) U.S. Cl.
USPC .......................................... 375/224; 375/368

(58) Field of Classification Search
USPC .................. 375/224, 226, 228, 368, 371, 373
See application file for complete search history.

(56) References Cited

U.S. PATENT DOCUMENTS

| 6,873,926 B1 | 3/2005 | Diab |
| 2005/0147197 A1* | 7/2005 | Perrott ........................ 375/376 |
| 2010/0104057 A1* | 4/2010 | Nedovic et al. ............... 375/360 |

\* cited by examiner

*Primary Examiner* — Kevin Kim
(74) *Attorney, Agent, or Firm* — Duane S. Kobayashi

(57) ABSTRACT

A system and method for physical layer device enabled clock diagnostics. The physical layer device can monitor the performance of a clock recovery module. Performance monitoring can be performed on the output clock signal or the control components used to generate the output clock signal. In one embodiment, the performance monitoring is correlated to particular data patterns to provide an accurate determination of variations or other inconsistencies within the clock recovery module.

16 Claims, 4 Drawing Sheets

SYSTEM AND METHOD FOR PHYSICAL LAYER DEVICE ENABLED CLOCK DIAGNOSTICS

BACKGROUND

1. Field of the Invention

The present invention relates generally to transmission systems and methods and, more particularly, to a system and method for physical layer device enabled clock diagnostics.

2. Introduction

Ethernet-based systems rely on a fundamental clock to transmit data. For example, for gigabit Ethernet such as 1000BASE-T this fundamental clock is a 125 MHz clock. In modern multi-port systems, all of the clocks are typically derived from a single oscillator. The receive clock, for example, often represents a phase adjusted version of the transmit clock.

More specifically, the 1000BASE-T system allows for one link partner to be configured as a master device and the other link partner to be configured as a slave device. In this master-slave configuration, the slave device is designed to transmit its data at the exact same rate at which the master device is transmitting its data. As noted above, 1000BASE-T transmission has the master device transmitting based on a 125 MHz clock. In reality, however, the clocks for the master device and the slave device will vary by some small amount due to variations ($\epsilon$) in the crystal oscillator when considering factors such as process and temperature variations.

To enable transmission at the same rate as the master device, it is therefore a function of the slave device to determine the value of $\epsilon$ from the incoming received signal and to ensure that it transmits to the master device at 125 MHz+$\epsilon$.

Timing recovery elements within the slave device enable a determination of the value of $\epsilon$. When the timing recovery process involves the received symbols it is referred to as decision directed (DD) timing recovery, otherwise it is referred to as non-decision directed (NDD) timing recovery. Regardless of the particular timing recovery system and/or method used, its proper functioning is a key element in ensuring that the master and slave devices communicate with low packet and symbol error rates. What is needed therefore is a mechanism that enables the PHY to ensure that the clock generation mechanism is operating correctly in generating a clock usable by the various ports.

SUMMARY

A system and/or method for physical layer device enabled clock diagnostics, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet-based communication systems rely on a fundamental clock for transmitting and receiving data. Regardless of the particular transmission rate (e.g., 10 Mbit/s, 100 Mbit/s, 1 Gbit/s, 2.5 Gbit/s, 5 Gbit/s, 10 Gbit/s, 40 Gbit/s, 100 Gbit/s and beyond) of the communication system, failures in the generation of a clock signal can produce higher packet and symbol error rates.

Conventional communication systems are not geared to self diagnosing the performance of the clock generation portion of the system. While system performance can be monitored from an error rate perspective, the diagnosis of the source of such error rates is relatively limited. This is especially true of the diagnosis of the clock generation portion of the system, the performance of which can degrade over time as the system ages.

Figure 1:
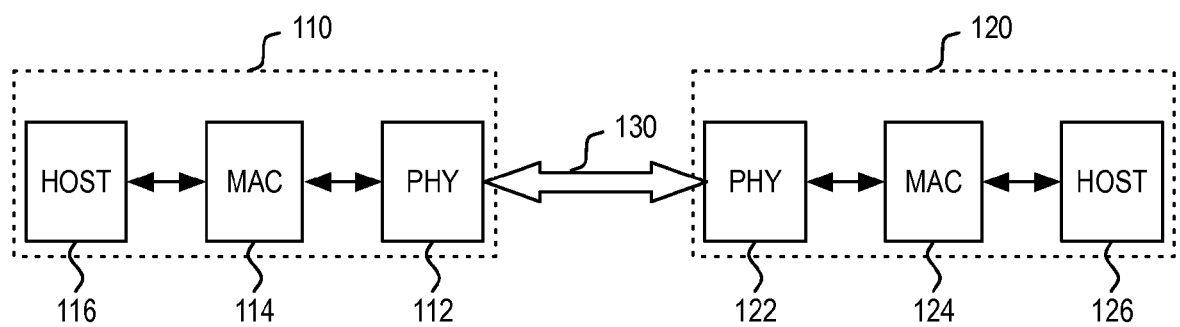
FIG. 1 illustrates an Ethernet link between a local and remote link partner.

Prior to describing the PHY enabled clock diagnostics of the present invention, a description of an Ethernet link between a local link partner and a remote link partner is first provided with reference to FIG. 1. As illustrated in FIG. 1, the Ethernet link comprises local link partner 110 and remote link partner 120. In various embodiments, link partners 110 and 120 can represent a switch, router, endpoint (e.g., server, client, VOIP phone, wireless access point, etc.), or the like.

Local link partner 110 and remote link partner 120 communicate via communication channel 130, which can be embodied in various forms such as an optical, backplane, or copper link. In a structured cabling example, communication channel 130 can include four wire pairs. As will become apparent from the detailed description below, the features of the present invention are not limited by the particular communication channel between local link partner 110 and remote link partner 120.

Local link partner 110 can include host 116, medium access control (MAC) controller 114, and PHY 112. Similarly, remote link partner 120 can include host 126, MAC controller 124, and PHY 122. PHYs 112, 122 can each comprise suitable logic, circuitry, and/or code that enable communication, for example, transmission and reception of data with the other link partner. PHYs 112, 122 can support multiple rates, which include standard rates (e.g., 10 Mbit/s, 100 Mbit/s, 1 Gbit/s, 10 Gbit/s, 40 Gbit/s, 100 Gbit/s, etc.) and non-standard rates (e.g., 2.5 Gbit/s, 4 Gbit/s, 20 Gbit/s, etc.). The data transmitted and/or received by PHYs 112, 122 can be formatted in accordance with the well-known OSI protocol standard.

In general, hosts 116 and 126 can comprise suitable logic, circuitry, and/or code that enable operability and/or functionality of the five highest functional layers for data packets that are to be transmitted over the link. Since each layer in the OSI model provides a service to the immediately higher interfacing layer, MAC controllers 114 and 124 can provide the necessary services to hosts 116 and 126, respectively, to ensure that packets are suitably formatted and communicated to PHYs 112 and 122. MAC controllers 114 and 124 can comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

As noted, a PHY can be configured as a master PHY device or a slave PHY device. The status of a PHY as either a master PHY or a slave PHY is determined during an auto-negotiation process that takes place prior to establishment of the transmission link. Once established, the master PHY transmits at a fixed frequency determined by an oscillator and runs its receiver at the exact same frequency. The slave PHY then recovers the clock from the signal received from the master PHY and uses the recovered clock to determine the timing of its receiver and transmitter operations. In this master-slave timing loop configuration, the slave PHY is designed to transmit its data at the exact same rate at which the master PHY is transmitting its data.

In real-world applications, the master PHY's transmission rate will vary by some small amount ($\epsilon$) due to oscillator variations. In a master-slave configuration, the slave PHY is responsible for determining the frequency variation from the incoming received signal using a timing recovery algorithm. Once the frequency variation is determined, the slave PHY can then transmit to the master PHY at 125 MHz+$\epsilon$.

Figure 2:
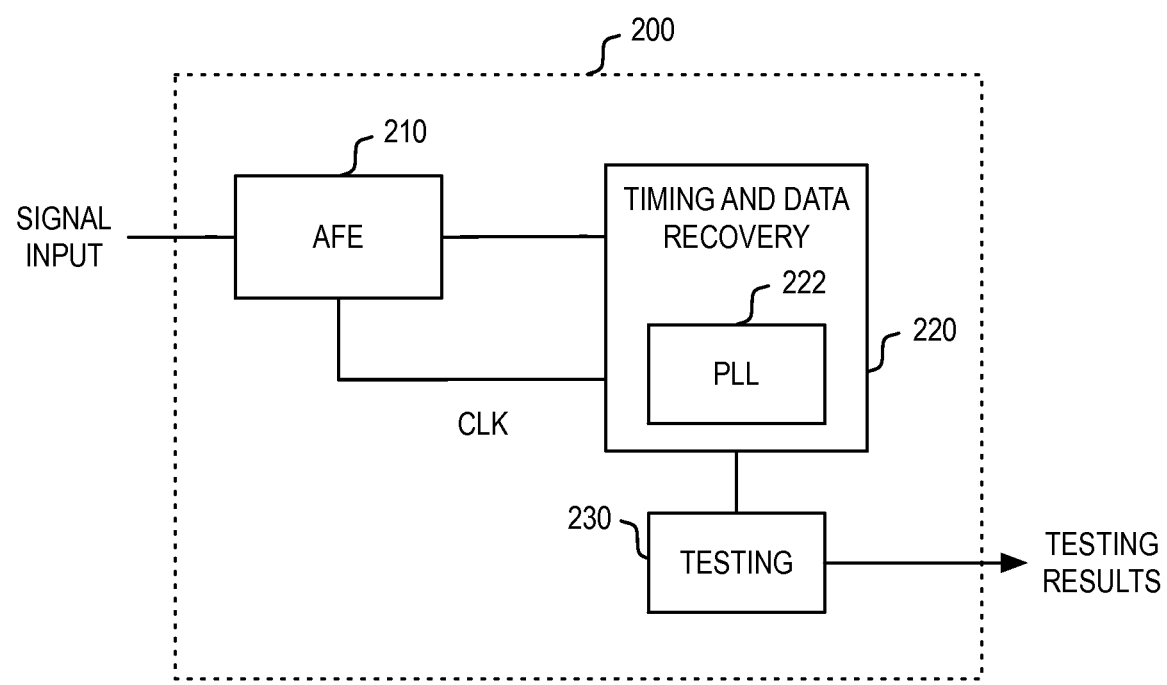
FIG. 2 illustrates an embodiment of a clock diagnostic system within a physical layer device.

FIG. 2 illustrates a simple block diagram of the receiver components within a PHY. As illustrated, receiver 200 includes analog front end (AFE) 210 that receives a signal input. AFE 210 is generally designed to perform an analog-digital sampling of the signal input based on a clock recovered from the signal input and that is aligned for optimal sampling. The digitized analog signal is then passed to timing and data recovery module 220 for optimization and equalization. In one embodiment, optimization and equalization is performed by a digital signal processor (not shown).

The recovered symbols generated after optimization and equalization can then be used in a DD timing recovery process. In one embodiment, the DD timing recovery process can be implemented by phase locked loop (PLL) 222, which can be responsible for estimating a phase offset/frequency offset of the receiver's oscillator to produce the optimal sampling phase for the signal input.

Figure 3:
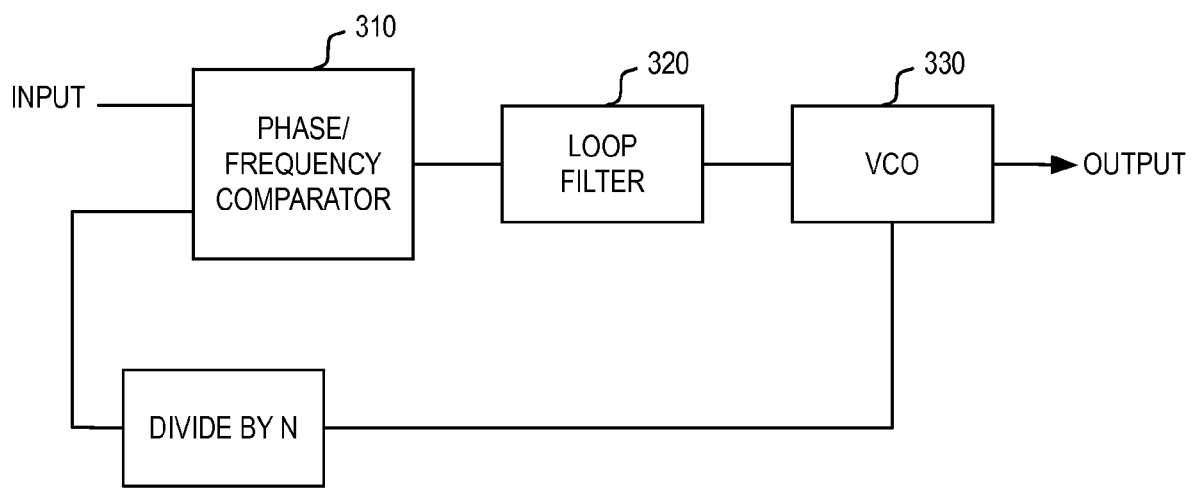
FIG. 3 illustrates an example of a phase locked loop structure.

FIG. 3 illustrates a high-level block diagram of an example PLL structure. As illustrated, the PLL structure includes phase/frequency comparator 310 that is designed to compare a phase or frequency characteristic of an input signal to a phase or frequency characteristic of reference signal produced by voltage controlled oscillator (VCO) 330. VCO 330 is connected in feedback fashion to provide a timing reference to phase/frequency comparator 310. The PLL structure further includes loop filter 320 coupled between phase/frequency comparator 310 and VCO 330 for developing a control voltage that controls the operational frequency of VCO 330. As would be appreciated, the control elements within phase/frequency comparator 310 and loop filter 320 that are used to generate a control signal for VCO 330 would be implementation dependent.

The operation of receiver 200 in recovering the optimal sampling phase for a clock used by AFE 210 is a critical component of receiver 200. It is a feature of the present invention that monitoring of the performance of the timing recovery can be performed within the PHY. Here, the monitoring of the performance of the timing recovery is implemented by testing module 230.

In one embodiment, testing module 230 can be designed to monitor phase locked loop 222 to identify any variations in operation. Here, testing module 230 can be designed to monitor one or more control elements within phase locked loop 222 that are used to control the oscillator. For example, testing module 230 can be designed to monitor a control capacitor within phase locked loop 222 that is used to store a charge in proportion to frequency. As would be appreciated, the principles of the present invention would not be dependent on the particular implementation of the phase locked loop or the control elements contained therein.

It is a feature of the present invention that monitoring a control element within a PLL or other timing recovery element can provide highly granular monitoring information that provides insight into the operational stability of the clock generating process. In one embodiment, this monitoring information can be correlated with particular data patterns that are received. This correlation process would enable the PHY to identify whether the clock generating process operated consistently in response to the same repeatable input data patterns.

For example, testing module 230 can be designed to periodically monitor one or more control elements within phase locked loop 222 when idle signal patterns are received. The response of the control elements to the same idle signal patterns would then enable testing module 230 to identify variations or other inconsistencies in the performance of those control elements to the same input data patterns. Measuring the responsiveness to idle signal patterns would be useful because idle signals are used frequently between link partners in the time span between Ethernet frames.

As would be appreciated, the principles of the present invention would not be limited to idle signal patterns. In one embodiment, specific signal patterns or packets can be defined that are designed to exercise the control elements within phase locked loop 222. Under control of the PHY, monitoring of the control elements can be correlated with the receipt of the specifically defined signal patterns or packets to thereby determine whether the phase locked loop has retained a full or sufficient range of acceptable performance. If the response to multiple instances of the specifically defined signal patterns exhibits variation or inconsistency beyond an acceptable margin, then testing module 230 can signal the potential of an error condition to the system via a management interface such as MDIO (using a different low frequency clock), which connects a MAC controller to a PHY. In one embodiment, a discovery of a variation can be used to indicate a switch over to a backup clock.

In the above description, the monitoring of one or more components of the phase locked loop or other timing recovery/clock generating module enables a highly granular monitoring process. This granular monitoring process can provide earlier indications of potential clock errors as compared to monitoring of the output clock signal.

In one embodiment, testing module 230 within the PHY can also monitor the clock signal in addition to or in place of monitoring the components of the phase locked loop. Where the clock signal is being monitored, the clock signal can be compared to delayed versions of the clocked signal or to other portions of the clock signal that are correlated to different instances of the same input signal pattern (e.g., idle signal pattern or other specifically defined signal pattern). In either case, the monitoring of the generated clock signal by the PHY would enable the PHY to perform clock diagnostics on behalf of the host system. In various examples, two clock signals can be compared using comparison circuits that are designed to detect missing clock pulses, delayed clock pulses or the like. Examples of such comparison circuits are provided in U.S. Pat. No. 6,873,926, which is incorporated herein by reference in its entirety.

While the example application described above focused on master/slave configurations, such example application is not intended to limit the scope of the present invention. The principles of the present invention can also be applied to systems having two different time domains. One example of such a system having two different time domains is in a system that extracts the clock from the received signal. Here, higher levels of the RX logic can rely on its TX clock, which is based on its own oscillator. A crossing of time domains therefore results. In this arrangement, if one of the two link partners' TX clocks goes outside of the defined PPM tolerance, then a speed mismatch would occur, hence resulting in errors (e.g., packet errors, CRC errors, or both). Errors can also be generated if the TX clocks are both within the defined PPM tolerance but one TX clock occasionally misses a beat, which leads to clocking of incorrect data. As would be appreciated, a combination of speed mismatches and missing beats can also occur.

Figure 4:
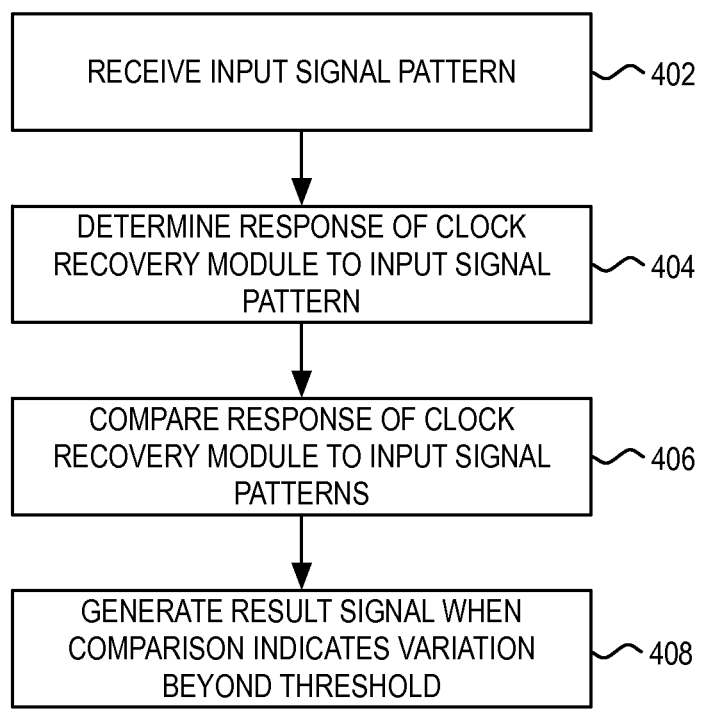
FIG. 4 illustrates a flowchart of a process of the present invention.

To further illustrate the features of the present invention, reference is now made to the flowchart of FIG. 4, which illustrates a PHY-enabled clock diagnostic process. As illustrated, the process begins at step 402 where an input signal pattern is received by a PHY receiver. In one embodiment, this input signal pattern is a defined signal pattern having multiple instances. For example, the defined signal pattern can be an idle signal pattern or any specifically designed signal pattern that can be used to facilitate the clock diagnostic process.

Next, at step 404, a response of the clock recovery module to the input signal pattern is determined by the PHY. In one embodiment, a testing module in the PHY monitors an output clock signal that is generated in response to the input signal pattern. In another embodiment, a testing module in the PHY monitors the performance of one or more components of the clock recovery module used to generate the output clock signal. For example, the testing module can be designed to monitor the performance of a control element such as a control capacitor used in a phase locked loop.

After multiple responses have been determined at step 404, the multiple responses can be compared at step 406. In one embodiment, the comparison can be between multiple output clock signals taken at different segments of time. In one example, the multiple output clock signals can be generated in response to multiple instances of the same input signal pattern. In another embodiment, the comparison can be between multiple signals representative of the response of a particular control component (e.g., control capacitor) used to generate a clock signal. Here, the multiple response signals for the particular control component can be generated in response to multiple instances of the same input signal pattern (e.g., idle signal pattern).

Based on the results of the comparison at step 406, the testing module in the PHY can generate a result signal when the comparison indicates a variation between the responses that exceeds the threshold. Where the comparison indicates variations beneath the threshold, then the testing module would conclude that the clock recovery module in the PHY is operating within defined specifications.

As has been described, clock diagnostics enabled in the PHY can be used to identify the performance of the clock generation system in the PHY. This diagnostic capability enables the PHY to identify variations in clock generation performance, which are critical to minimizing data transmission errors.

In one application, the principles of the present invention can be applied to energy efficient Ethernet (EEE) systems. In an EEE application, the operation of portions of the PHY can be suspended (e.g., low power idle, subset PHY, etc.) to facilitate power savings during low link utilization periods. Upon a transition from an inactive or suspended state back to an active state, the performance of the clock will play a significant role in minimizing the startup time of the PHY. As would be appreciated, longer startup times can reduce potential power savings and/or require additional buffering. The principles of the present invention can therefore be used to minimize the potential impact of the source clock on the EEE process.

The enabling of diagnostic capability in the PHY is advantageous in that the diagnostic system can also be configured to monitor other parameters important to the system (including on the RX side). These monitored parameters can be useful in the diagnosis of any clock-related issues.

Also, on a multi-port PHY or multi-port system, the diagnostic system can look at inputs from multiple ports. For example, in a chassis system that has 384 ports, diagnostics can be performed using up to 384 measurement points. Baselines and/or statistics for the 384 ports can then be established, which can lead to refined data capture and problem isolation. For example, if all 384 ports are showing similar behavior, then the issue is likely the oscillator. If a subset of the 384 ports are indicating a problem, then the oscillator may be operating within specification, but that there may exist an issue in a subsystem (e.g., line card) or a particular PHY. Isolation of the problem using PHY-enabled diagnostics of the present invention can be used to initiate automated recovery processes such as, for example, a switch over to a backup oscillator or clock generation system.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a physical layer device, comprising:
   receiving, by said physical layer device, a first instance of an input signal pattern;
   determining, by said physical layer device, a first response of a clock recovery circuitry circuit in said physical layer device to said first instance of said input signal pattern;
   receiving, by said physical layer device, a second instance of said input signal pattern;
   determining, by said physical layer device, a second response of said clock recovery circuitry circuit to said second instance of said input signal pattern;
   comparing, by said physical layer device, said determined first response to said determined second response, wherein said comparing comprises comparing responses of a capacitor control element in a phase locked loop in said clock recovery circuit; and generating, by said physical layer device, a result signal indicative of an error condition if said comparison of said determined first response to said determined second response indicates a variation beyond an acceptable threshold amount.

2. The method of claim 1, wherein said receiving comprises receiving an idle signal pattern.

3. The method of claim 1, wherein said receiving comprises receiving a signal pattern designed to test said clock recovery circuit.

4. The method of claim 1, wherein said determining comprises determining an output of a phase locked loop.

5. The method of claim 1, wherein said determining comprises determining a response of a component of a phase locked loop.

6. The method of claim 5, wherein said determining comprises determining a response of a control element of said phase locked loop.

7. The method of claim 6, wherein said determining comprises determining a response of a capacitor of said phase locked loop.

8. The method of claim 1, wherein said comparing comprises comparing first and second outputs of a phase locked loop in said clock recovery circuit.

9. A method in a physical layer device, comprising:
   receiving, by said physical layer device, a first instance of an input signal pattern;
   determining, by said physical layer device, a first response of a capacitor in a clock recovery module in said physical layer device to said first instance of said input signal pattern;
   receiving, by said physical layer device, a second instance of said input signal pattern;
   determining, by said physical layer device, a second response of said capacitor to said second instance of said input signal pattern;
   comparing, by said physical layer device, said determined first response of said capacitor to said determined second response of said capacitor; and
   generating, by said physical layer device, a result signal indicative of an error condition if said comparison of said determined first response of said capacitor to said determined response of said capacitor indicates a variation beyond an acceptable threshold.

10. The method of claim 9, wherein said receiving comprises receiving an idle signal pattern.

11. The method of claim 9, wherein said receiving comprises receiving a signal pattern designed to test said capacitor.

12. A physical layer device, comprising:
   an analog front end that receives a signal input, said analog front end performing an analog to digital sampling of said signal input based on a sampling clock that is aligned for optimal sampling; and
   a clock recovery and testing module, said clock recovery and testing module generating said sampling clock based on an analysis of said samples generated by said analog front end, said clock recovery and testing module including a monitoring element that is designed to monitor a response of a capacitive control component of a phase locked loop of said clock recovery and testing module to a predefined input signal pattern, said monitoring element being designed to generate a result signal indicative of an error condition when a response of said component to different received instances of said predefined input signal pattern indicates a variation beyond an acceptable threshold amount.

13. The physical layer device of claim 12, wherein said predefined input signal pattern is an idle pattern.

14. The physical layer device of claim 12, wherein said predefined input signal pattern is a signal pattern designed to test said capacitive control component.

15. The physical layer device of claim 12, wherein said clock recovery and testing module generates a statistical analysis of a variance of said response to said different received instances of said predefined input signal pattern.

16. The physical layer device of claim 12, wherein the physical layer device supports a reduced power state for use during periods of low link utilization.

* * * * *